United States Patent [19]
Heinrich

[11] 4,010,973
[45] Mar. 8, 1977

[54] MOTOR CAMPER ACCESSORY
[75] Inventor: Manfred G. Heinrich, Richmond, Canada
[73] Assignee: The Raymond Lee Organization, Inc., New York, N.Y. ; a part interest
[22] Filed: Sept. 8, 1975
[21] Appl. No.: 611,569
[52] U.S. Cl. .............................. 296/23 R; 135/5 A
[51] Int. Cl.² .......................................... B60P 3/32
[58] Field of Search ................ 296/23 R, 23 A, 26; 135/1 A, 3 A, 5 A, 5 AT

[56] References Cited
UNITED STATES PATENTS

| | | | |
|---|---|---|---|
| 2,870,774 | 1/1959 | Blosser | 135/1 A |
| 2,895,572 | 7/1959 | Brinck | 296/23 R |
| 3,088,475 | 5/1963 | Muhr | 135/1 A |
| 3,231,161 | 1/1966 | Calthorpe | 135/1 A |
| 3,394,719 | 7/1968 | Hansson | 135/1 A |
| 3,438,670 | 4/1969 | Salmans | 296/23 R |
| 3,463,540 | 8/1969 | Carr | 296/23 R |
| 3,521,926 | 7/1970 | Brewin | 296/23 R |
| 3,707,977 | 1/1973 | Grady | 135/5 A |
| 3,894,765 | 7/1975 | Bourke | 296/23 R |
| 3,923,336 | 12/1975 | Price | 296/23 R |

*Primary Examiner*—Robert R. Song
*Assistant Examiner*—John A. Carroll
*Attorney, Agent, or Firm*—Daniel Jay Tick

[57] ABSTRACT

A plurality of spaced tracks are affixed to the roof of a vehicle and extend from side to side of the vehicle in parallel relation with each other. A platform having approximately the same dimensions as the roof of the vehicle has rollers affixed to an underside thereof rollably mounting the platform on the tracks for movement to a position covering the roof and to an extended position extending beyond the roof from a side of the roof in approximately the plane of the roof. Support posts support two corners of the platform farthest from the vehicle when the platform is in its extended position for maintaining the platform at approximately the level of the roof above the ground whereby the platform in its extended position covers an area of ground alongside the vehicle.

3 Claims, 6 Drawing Figures

MOTOR CAMPER ACCESSORY

DESCRIPTION OF THE INVENTION

The present invention relates to a motor camper accessory. More particularly, the invention relates to a motor camper accessory for a motor camper vehicle.

Objects of the invention are to provide a motor camper accessory of simple structure, which is inexpensive in manufacture, installed with facility and convenience on new and existing vehicles, used with facility, convenience, ease and facility, and functions efficiently, effectively and reliably as a tent-like structure when it is moved to its extended position in a very brief time and with considerable ease and facility, and functions as a storage member when it is moved to its roof covering position in a very brief time and with considerable ease and facility.

In order that the invention may be readily carried into effect, it will now be described with reference to the accompanying drawing, wherein.

Figure 1:
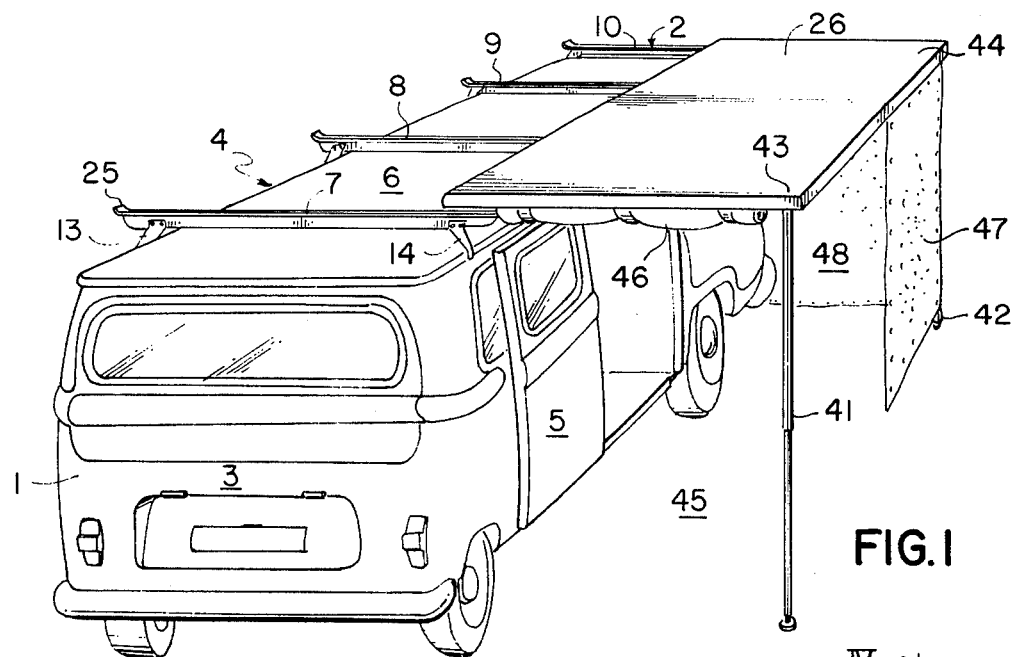
FIG. 1 is a perspective view of an embodiment of the motor camper accessory of the invention mounted on a vehicle and in its extended position.

The motor camper accessory of the invention is for a motor camper vehicle 1 (FIG. 1) having a front 2, a rear 3, a pair of sides 4 and 5 and a roof 6 extending from front to rear and side to side, as shown in FIG. 1.

Figure 2:
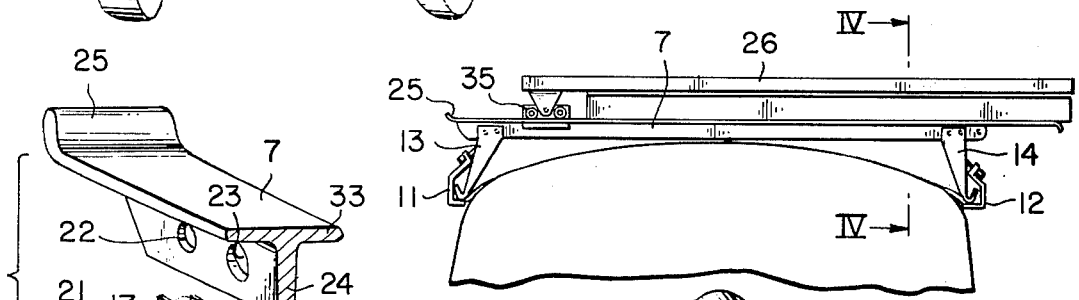
FIG. 2 is a view of an embodiment of the motor camper accessory of the invention as it is being moved from one position to another.

The motor camper accessory of the invention comprises a plurality of spaced tracks 7, 8, 9 and 10 (FIG. 1) affixed to the roof 6 of the vehicle 1 and extending from side to side of the vehicle in parallel relation with each other. The tracks 7 to 10 are affixed to the roof 6 by mounting brackets of the type shown in FIG. 3. When the roof is flat, as shown in FIG. 1, the mounting brackets are directly affixed to an edge of the roof in the manner shown in FIG. 1. When the roof is rounded, the mounting brackets are affixed to the edges of the roof via elongated angle members, both of which members 11 and 12 are shown in FIG. 2. The track mounting device comprises a pair of bracket members 13 and 14 for each track, each bracket member being affixed to a corresponding edge of the roof. Thus, as shown in FIGS. 1 and 2, the track 7 is mounted on the roof via a pair of bracket members 13 and 14.

Figure 3:
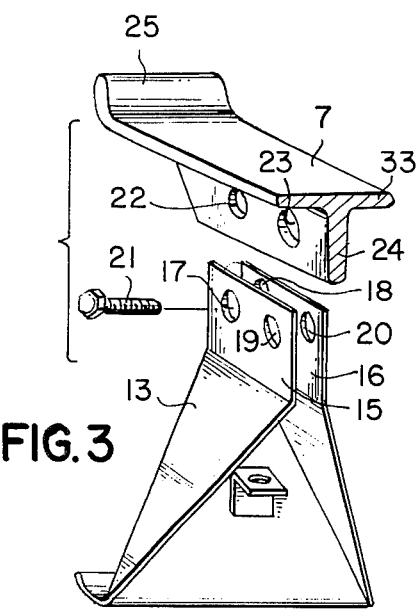
FIG. 3 is an exploded perspective view on an enlarged scale, of an embodiment of a mounting device and part of a track of the embodiment of FIG. 1.

Each bracket member is affixed to a corresponding end of each track via a pair of spaced plates 15 and 16 of the bracket member, as shown in FIG. 3, having bores 17, 18, 19 and 20 formed therethrough, and bolts, of which a single bolt 21 is shown in FIG. 3, which pass through said bores and through corresponding bores 22 and 23 (FIG. 3) of the stem 24 of the track which is seated between the plates 15 and 16. The track is of T-shaped cross-section and is bent upward at the driver's side of the roof, as shown at 25 in FIGS. 1, 2 and 3, to prevent the platform from rolling off the track.

A platform 26 (FIGS. 1, 2 and 4) has approximately the same dimensions as the roof 6 of the vehicle. The platform 26 has roller devices affixed to the underside 27 thereof (FIG. 4) rollably mounting the platform on the tracks 7 to 10 for movement to a position covering the roof, and to an extended position, shown in FIG. 1, extending beyond the roof from the side 5 of the roof in approximately the plane of the roof.

Figure 5:
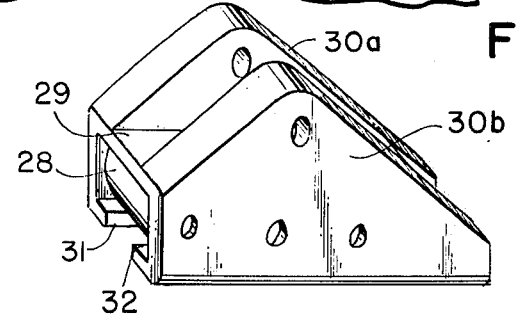
FIG. 5 is a perspective view of an embodiment of a mounting device of the motor camper accessory of the invention.

FIG. 5 illustrates one type of roller device in which a plurality of rollers 28, and so on, are rotatably mounted in parallel relation in a housing 29, which is affixed via pivot parts 30a and 30b thereof to the underside 27 of the platform 26 at each track. That is, a plurality of roller devices are affixed to the platform; one at each track. The housing 29 has a pair of flanges 31 and 32 extending toward each other from the sides thereof at the bottom thereof and leaving a gap therebetween. The flanges 31 and 32 fit under the corresponding sides of the head 33 of the track (FIGS. 3 and 4) thereby retaining the housing 29, and thus the platform 26, on the tracks and on the roof in rollable condition.

Figure 4:
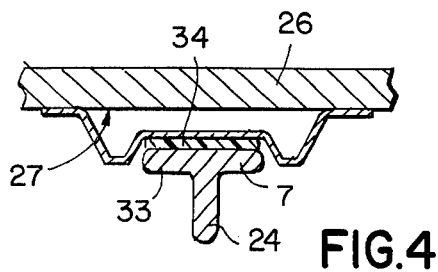
FIG. 4 is a cross-sectional view, on an enlarged scale, taken along the lines IV—IV, of FIG. 2.

In the embodiment of FIGS. 2 and 4, the platform is slidably mounted on top of the head 33 of the track via a layer 34 of plastic material which reduces the friction between the abutting surfaces. The sides of the platform 26 may be mounted on the track via rollers 35, as shown in FIG. 2. That is, a plurality of roller devices of the embodiment of FIGS. 2 and 4 are affixed to the platform; one at each track.

Figure 6:
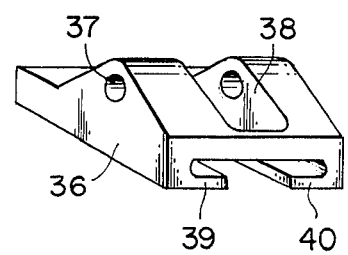
FIG. 6 is a perspective view of another embodiment of a mounting device of the motor camper accessory of the invention.

The mounting device of the embodiment of FIG. 6 comprises a housing 36 which is pivotally affixed via pivot parts 37 and 38 thereof to the underside of the platform 26 at each track. The housing 36 has a pair of flanges 39 and 40 extending toward each other from the sides thereof at the bottom thereof and leaving a gap therebetween. The flanges 39 and 40 fit under the corresponding sides of the head 33 of the track thereby retaining the housing 36, and thus the platform 26, on the tracks and on the roof in slidable position. That is, a plurality of the devices of FIG. 6 are affixed to the platform; one at each track.

A pair of support posts 41 and 42 which are preferably telescopically formed, support two corners 43 and 44 of the platform 26 farthest from the vehicle when the platform is in its extended position, as shown in FIG. 1, for maintaining the platform at approximately the level of the roof above the ground whereby the platform in its extended position covers an area 45 of ground alongside the vehicle 1.

Each of a plurality of sheets of tent material 46, 47 and 48 is removably affixed at one edge to the underside of the platform 26 at a corresponding edge of the platform. Each of the sheets is stored in rolled condition for selectively extending the sheets to form sheltering sides for the platform in the extended positions of the sheets, as shown by the sheets 47 and 48, in FIG. 1.

When the motor camper is travelling, the platform 26 is securely fastened to said camper by any suitable devices such as, for example, clamps, wedges, catches, or the like, to prevent rattling and/or accidental loss of said platform.

When the platform 26 is fully extended and resting on the posts 41 and 42, any suitable locking device is utilized to prevent accidental collapse of said platform, due, for example, to wind or someone leaning on the posts or bumping into them and thereby pushing said platform partly back onto the roof of the camper.

FIG. 4 illustrates the great area of weight distribution for any load carried on the platform 26, when said platform is used as a roof carrier. A full-surfaced contact between the platform and the tracks eliminates gradual sagging when loads are carried and/or vibration when the camper is travelling. When the platform is moved onto or off the roof of the camper, it should be lifted slightly for substantially effortless movability. The plastic layer 34 prevents friction and seizure caused by metal rubbing on metal. This is especially bad when aluminum is used.

While the invention has been described by means of specific examples and in specific embodiments, I do not wish to be limited thereto, for obvious modifications will occur to those skilled in the art without departing from the spirit and scope of the invention.

I claim:

1. A motor camper accessory for a motor camper vehicle having a front, a rear, a pair of sides and a roof extending from front to rear and side to side, said motor camper accessory comprising a plurality of spaced tracks affixed to the roof of a vehicle and extending from side to side of the vehicle in substantially parallel relation with each other, each of the tracks being of T-shaped cross-section and being bent upward at the driver's side of the roof;

a platform having approximately the same dimensions as the roof of the vehicle and having roller means affixed to an underside thereof rollably mounting the platform on the tracks for movement to a position covering the roof and to an extended position extending beyond the roof from a side of the roof in approximately the plane of the roof; and support posts for supporting two corners of the platform farthest from the vehicle when the platform is in its extended position for maintaining said platform at approximately the level of the roof above the ground whereby said platform in its extended position covers an area of ground alongside the vehicle.

2. A motor camper accessory as claimed in claim 1, further comprising a plurality of sheets of tent material each removably affixed at one edge to the underside of the platform at a corresponding edge of the platform and stored in rolled condition for selectively extending the sheets to form sheltering sides for the platform in its extended position.

3. A motor camper accessory as claimed in claim 1, wherein the roller means comprises a pair of spaced parallel pivot parts affixed to the underside of the platform, a housing affixed to the pivot parts, a plurality of rollers rotatably mounted in parallel relation in the housing and a pair of flanges extending toward each other from the sides at the bottom of the housing beneath the rollers, said flanges fitting under the sides of the head of the track to retain the housing on the track.

* * * * *